US008509955B2

(12) United States Patent
Larsson et al.

(10) Patent No.: US 8,509,955 B2
(45) Date of Patent: Aug. 13, 2013

(54) SYSTEM AND METHOD FOR CONTROLLING A DISTRIBUTION OF ELECTRICAL POWER

(75) Inventors: Mats Larsson, Daettwil (CH); Christian Frei, Fislisbach (CH); Adrian Timbus, Daettwil (CH); Cherry Yuen, Baden (CH)

(73) Assignee: ABB Research Ltd, Zurich (CH)

( * ) Notice: Subject to any disclaimer, the term of this patent is extended or adjusted under 35 U.S.C. 154(b) by 157 days.

(21) Appl. No.: 12/878,454

(22) Filed: Sep. 9, 2010

(65) Prior Publication Data

US 2011/0035067 A1 Feb. 10, 2011

Related U.S. Application Data

(63) Continuation of application No. PCT/EP2009/052700, filed on Mar. 9, 2009.

(30) Foreign Application Priority Data

Mar. 10, 2008 (EP) ..................................... 08152500

(51) Int. Cl.
*G05D 3/12* (2006.01)
(52) U.S. Cl.
USPC ............................................. 700/286; 700/9
(58) Field of Classification Search
USPC ............... 700/2, 3, 9, 17, 19, 20, 22, 28, 286, 700/292, 297
See application file for complete search history.

(56) References Cited

U.S. PATENT DOCUMENTS 6,067,477 A * 5/2000 Wewalaarachchi et al. ..... 700/83
2009/0112375 A1* 4/2009 Popescu ......................... 700/292

OTHER PUBLICATIONS

Utility Communications Architecture (UCA®) Object Models for Distributed Energy Resources UCA-DER, Final Report, Electricity Innovation Institute and Electric Power Research Institute, Inc., Dec. 2003.*
International Search Report (PCT/ISA/210) dated Jul. 9, 2009.
European Search Report dated Nov. 4, 2008.
International Preliminary Report on Patentability (PCT/IPEA/409) dated May 5, 2010.
Per Lund, "The Danish Cell Project—Part 1: Background and General Approach", IEEE 2007, Power Engineering Society General Meeting, Jun. 2007, pp. 1-6.
ABB, "MicroSCADA pro, SYS 600 9.2: System Configuration, Configuration Manual", retrieved from the Internet: URL:http://library.abb.com/global/scott/scot229.nsf/veritydisplay/330aed88463014b7c12573f5004eabd8/$File/SYS600_cm_756112_ENb.pdf>, Dec. 31, 2007, pp. 1-193.

(Continued)

*Primary Examiner* — Carlos Ortiz Rodriguez
(74) *Attorney, Agent, or Firm* — Buchanan Ingersoll & Rooney PC

(57) ABSTRACT

A method and system are provided for controlling a distribution of electrical power in a power distribution network having a first power distribution region and a second power distribution region. The first power distribution region can include first primary devices that interact with first process devices, and the second power distribution region can include second primary devices that interact with second process devices a distribution controller including a standardized description of the first region. A first distribution controller can be connected to the first process devices, can control a distribution of electrical power in the first power distribution region, and can identify, following a network reconfiguration, an orphan network section that is disconnected from the first region and connected to the second region. The first distribution controller can transmit a standardized description of the identified orphan network section to a second distribution controller connected to the second process devices.

20 Claims, 2 Drawing Sheets

(56) References Cited

OTHER PUBLICATIONS

ABB, "MicroSCAFA Pro, DMS 600 4.1: Operation Manual", Retrieved from the Internet: URL:http//library.abb.com/global/scot/scot229.nsf/veritydisplay/a1b767ee53dd1462c225703b002caee0/$File/DMS600_Operation%20ManualENc.pdf>, Feb. 28, 2005, pp. 1-164.

Watson B. et al., "Benefits of distribution automation and performance results from a network trial", Developments in Power System Protection, Sixth International Conference, Mar. 25, 1997, pp. 251-255.

Silva M P et al., "A web brower based dms—distribution management system", Power Engineering Society Summer Meeting, Jul. 20, 2000, vol. 4, pp. 2338-2343.

* cited by examiner

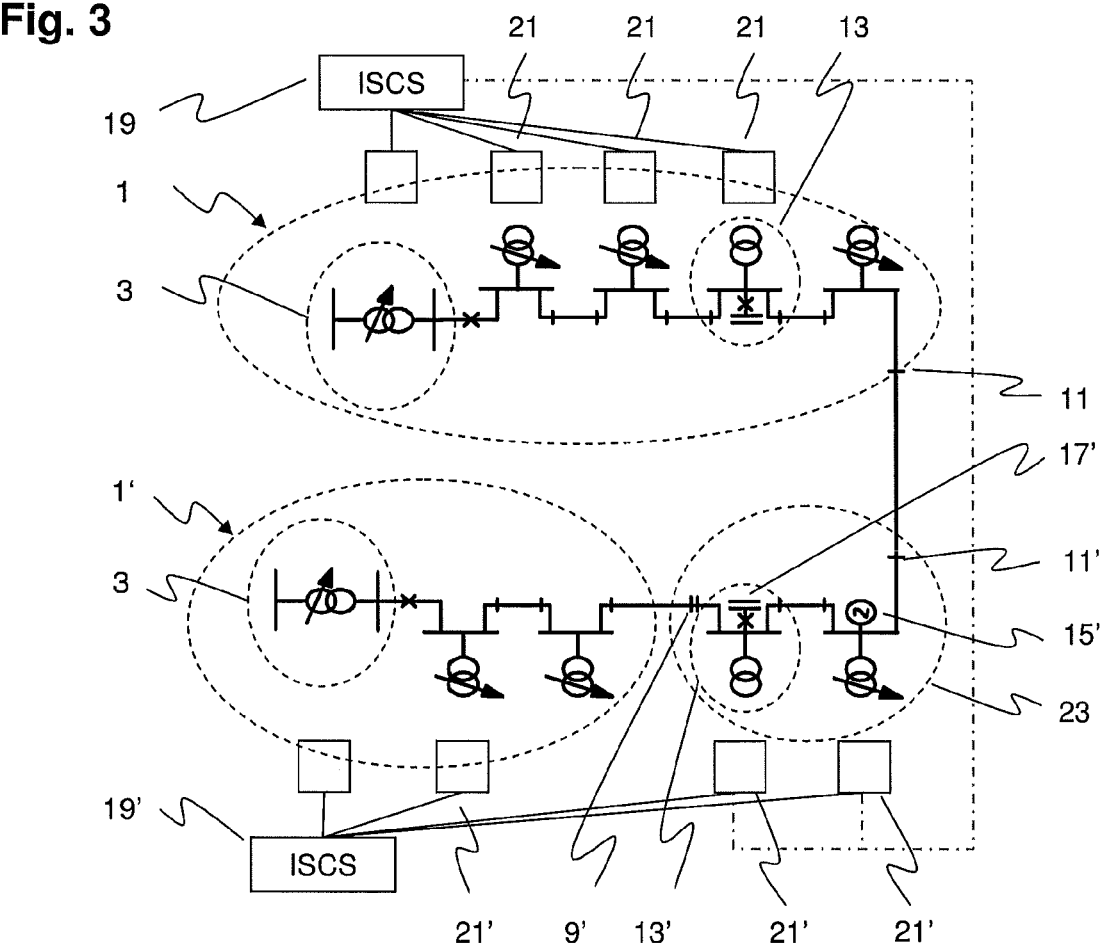

SYSTEM AND METHOD FOR CONTROLLING A DISTRIBUTION OF ELECTRICAL POWER

RELATED APPLICATIONS

This application claims priority as a continuation application under 35 U.S.C. §120 to PCT/EP2009/052700, which was filed as an International Application on Mar. 9, 2009 designating the U.S., and which claims priority to European Patent Application No. 08152500.8 filed in Europe on Mar. 10, 2008. The entire contents of these applications are hereby incorporated by reference in their entireties.

FIELD

The disclosure relates to controlling electrical power distribution in a power distribution network.

BACKGROUND INFORMATION

A power distribution system can be an interface between the power transmission network and electricity end-customers. For example, a power distribution system can include a number of primary substations which are connected to secondary substations via power lines and switches. The primary substations can contain transformers that reduce the voltage from the HV (high voltage) level of the transmission or sub-transmission grid down to MV (medium voltage) levels suitable for regional transmission. Distribution level network control can involve pieces of secondary equipment interacting with the primary equipment of the substations and power lines. Primary equipment or devices can include switches, tap changers, capacitor banks, and the like. Distribution areas, (also termed regions or cells herein) can be assigned to one single primary substation and defined by electrically unambiguously connected primary equipment. For example, the primary equipment can be connected in a tree or feeder structure. However, a distribution area is subject to changes during reconfiguration of network topology. These changes can potentially lead to a discrepancy between the distribution area and a virtual domain of associated secondary equipment. In addition, distributed generation of electric power on lower voltage levels of the distribution system can generate some considerable coordination tasks for distribution level network control.

By way of example, the paper by Per Lund entitled "The Danish Cell Project—Part 1: Background and General Approach", IEEE 2007, Power Engineering Society General Meeting, June 2007, describes a Cell Controller Pilot Project which aims at developing a new solution for optimal management and active grid utilisation of the large amount of distributed generation present in Western Denmark. For this purpose, the 60 kilo Volt (kV) network parts below each 150/60 kV transformer at the primary substations can be operated as radial networks by opening a sufficient number of 60 kV line breakers in selected substations and thus sectioning the otherwise meshed networks of the 60 kV distribution systems. Each of these radially operated 60 kV networks can then define a 60 kV distribution cell, to be controlled by a cell controller with a number of functions and a link to the Supervisory Control And Data Acquisition (SCADA) system at the Network Control Center (NCC) of the Distribution Network Operator (DNO).

Cell or distribution controllers, also termed Intelligent Substation Control Systems (ISCS), may comprise one or several physical devices and can be located in a primary substation of a distribution area. An ISCS is capable of functioning as a substation gateway to the NCC by providing gateway functions for mapping signals between secondary equipment for protection and control and higher-level systems. For example, the ISCS can translate internally process data from various master protocols into a standard protocol, e.g. the IEC 61850 standard data model, and can translate the data from the standard data model into a common slave protocol.

According to one example, an ISCS is connected through the existing communication infrastructure to an NCC, the ISCS and the NCC communicating via a tele-control protocol of the master-slave type, for instance IEC 60870-5-101. A number of other protocols, such as SPA, LON-LAG and IEC 60870-5-103, are used to connect the ISCS to the secondary or process devices for protection, control and monitoring purposes. The process devices can, for example, be located in the vicinity of the primary devices and execute local decision logic. On the other hand, the IEC 61850 standard protocols are client-server based, which allows several clients to access data from a same server or process device. They define the semantics of the data within the substation in a standardized object-oriented way, and offer a standardized method to transfer data between different engineering tools in a standardized format.

The ISCS can include, for example, OPC (Object-Linking and Embedding (OLE) for Process Control, also referred to as "OPen Connectivity") Data Access client and server components. OPC Data Access is a group of standards that provides specifications for continuously communicating real-time data from data acquisition devices to process or interface devices and for synchronizing process measurements with mirror entries at an OPC server. OPC also allows a client application to access several data items with one single request. OPC clients are used for slave/server protocol stacks to enable external systems to access data available on OPC Servers. OPC servers in the ISCS can be used, for example, for master/client protocol stacks in order to provide access to the data in the data acquisition or process devices connected via a particular protocol. Different types of OPC server instances, depending on the process devices connected and/or the protocols (LON, SPA, or IEC 61850) used to communicate with the process devices are instantiated in the ISCS.

SUMMARY

A system is disclosed for controlling a distribution of electrical power in a power distribution network, the system comprising: a distribution controller including a standardized description of a first power distribution region of a power distribution network, wherein the distribution controller is configured to be connected to first process devices of the first power distribution region, and to control a distribution of electrical power in the first power distribution region; and means to identify, following a network reconfiguration, an orphan network section that is disconnected from the first power distribution region and connected to a second power distribution region of the power distribution network, wherein the distribution controller is configured to transmit a standardized description of the identified orphan network section to another distribution controller connected to second process devices of the second power distribution region of the power distribution network.

A method is disclosed of controlling a distribution of electrical power in a power distribution network having a first power distribution region including first primary devices configured to interact with first process devices, a second power distribution region including second primary devices configured to interact with second process devices, a first distribution controller connected to the first process devices and provided with a standardized description of the first power distribution region, and a second distribution controller connected to the second process devices, the method comprising: identifying, following a network reconfiguration, an orphan network section that is disconnected from the first power distribution region and connected to the second power distribution region; and transmitting, by the first distribution controller, a standardized description of the orphan network section to the second distribution controller.

A computer readable recording medium is disclosed having instructions stored thereon for controlling one or more processors of a first distribution controller in a power distribution network, the power distribution network having a first power distribution region including first primary devices configured to interact with first process devices, a second power distribution region including second primary devices configured to interact with second process devices, the first distribution controller connected to the first process devices; and a second distribution controller connected to the second process devices, wherein, when the instructions are executed by the one or more processors of the first distribution controller, the computer readable recording medium causes the first distribution controller to perform the following operations: identifying, following a network reconfiguration, an orphan network section that is disconnected from the first power distribution region and connected to the second power distribution region; and transmitting, by the first distribution controller, a standardized description of the orphan network section to the second distribution controller.

BRIEF DESCRIPTION OF THE DRAWINGS

The subject matter of the disclosure will be explained in more detail in the following text with reference to exemplary embodiments which are illustrated in the attached drawings, in which:

FIG. 3 shows an exemplary power distribution system following a reconfiguration.

The reference symbols used in the drawings, and their meanings, are listed in summary form in the list of reference symbols. In principle, identical parts are provided with the same reference symbols in the figures.

DETAILED DESCRIPTION

Figure 1:
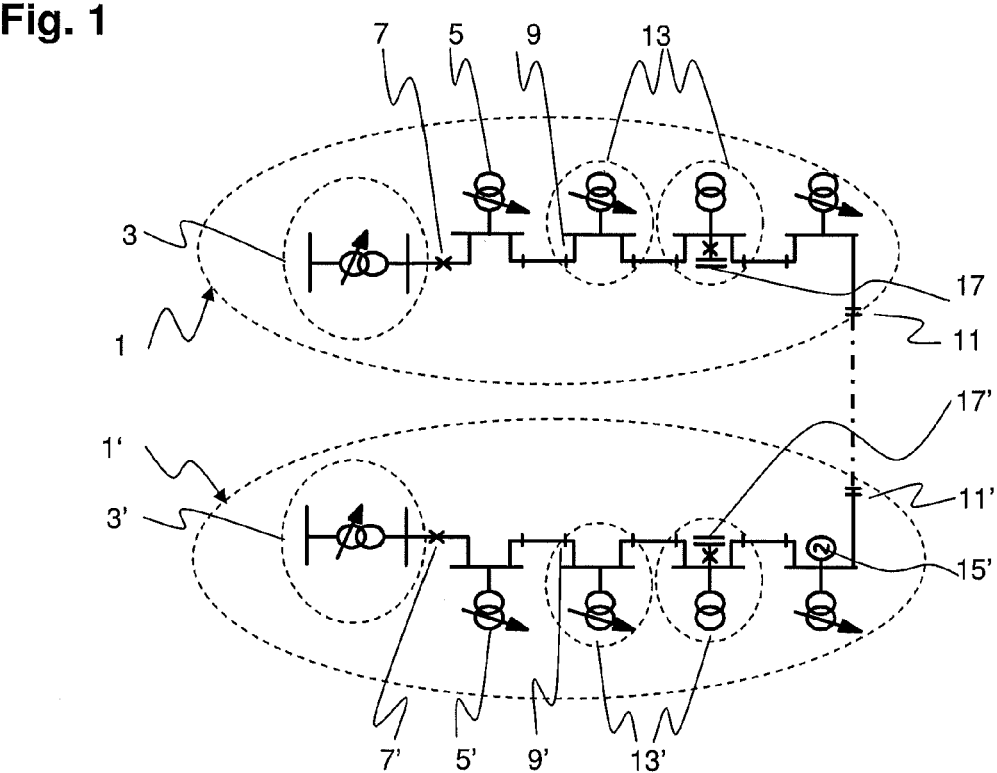
FIG. 1 shows two exemplary distribution areas of a power distribution system according to an exemplary embodiment of the disclosure.

Exemplary embodiments as disclosed herein can facilitate distribution control in electrical power distribution systems with a plurality of distribution regions or cells.

According to an exemplary embodiment of the disclosure, a distribution controller for controlling a distribution of electrical power in an assigned first power distribution region can be connected to process devices. The process devices can, for example, interact with primary devices of the assigned first region. The distribution controller can be provided with a standardized, machine-readable network description of the first region and comprises means (e.g., a software or firmware module) to identify, following a network reconfiguration, the extent of an orphan network section that is no longer connected to the first region. The distribution controller can be further adapted to transmit a description of the orphan network section to a second distribution controller controlling a second or neighbouring power distribution region to which the orphan section has been connected as a consequence of the network reconfiguration. Due to this capability of transmitting descriptions of the orphan network section, keeping and updating a description of the entire network in each controller of the power distribution system can be rendered unnecessary. This can reduce the requirements on memory allocation to and computational power of the distribution controllers.

In a exemplary embodiment of the disclosure, the distribution controller is adapted to accommodate a master representation of a process device of the first region including the process device's functionality or, in case of an IEC 61850 compliant Intelligent Electronic Device, the process device's individual Logical Nodes (LN). This representation can be an object of a Common Data Model (CDM) which can be, via the object's attributes, intrinsically linked to the represented process device and hosted or accommodated e.g. by an OPC server instance of the controller. The distribution controller can be further adapted to transmit information to the second distribution controller for the purpose of generating, by the second distribution controller, an alias or mirror copy of the master CDM object.

In an exemplary variant of the disclosure, the distribution controller can be provided with a standardized description of the first region that includes the switching devices forming a boundary or link to adjacent distribution regions, together with an identification, for each of these switching devices, of the respective adjacent distribution region. This information can be updated and shared with its neighbours upon a transfer of the orphan section to the second distribution area. Hence, upon occurrence of a subsequent network reconfiguration, a repeated use of a procedure according to an exemplary embodiment of the disclosure will reassign or transfer any further orphan section to the correct neighbour area.

The disclosure also provides an exemplary method of controlling distribution of electrical power over a power distribution network, where the power distribution network includes a number of primary devices assigned to at least two non-overlapping distribution regions, and two distribution controllers connected to process or secondary devices which in turn interact with primary devices in the respective distribution region. The exemplary method can include (i) identification, following a network reconfiguration, of an orphan network section that is disconnected from the first region and connected to the second region, and (ii) transmission, by the first distribution controller, of a standardized description of the orphan network section to the second distribution controller. In an exemplary embodiment, an alias representation of a process device of the orphan network section can then be generated by the second distribution controller.

In a further exemplary embodiment, the alias object and the master representation can be synchronized by means (e.g., a firmware and/or software module) of repeated read/write or refresh operations. This can enable the second distribution controller to access data from the process device represented by the master CDM object and to issue control commands on its behalf. Hence, there can be no difference between the operational behaviour of an alias object and the master representations by the second controller.

In an exemplary embodiment, and following a second reconfiguration of the distribution network, an orphan section comprising primary equipment that was previously transferred from the first distribution region to the second distribution region can be reassigned from the second distribution region to a third distribution region. In such an embodiment, a second generation alias of a process device interacting with the primary equipment can be created by the third controller. The second generation alias can then be synchronized directly with the master representation at the first controller, bypassing the alias at the second controller which, for example, can be erased. If there is no direct communication link between the first and third controller, the alias at the second controller can be used by the third controller as a bridge to the original CDM object at the first controller. Repeated inheritance of network sections, can for example, be limited by the physical capacity of the power lines leading into/from the repeatedly extended distribution region.

The present disclosure also relates to a computer program including computer program code means for controlling one or more processors of a distribution controller connected to process devices of an electrical power distribution region. The computer program can be stored on a computer readable medium such as a memory integrated in the controller or a data carrier that can be inserted into the controller, and which computer program, when executed, makes the distribution controller operate in accordance with the disclosure.

FIG. 1 illustrates an exemplary power distribution system comprising a first distribution region 1 and second distribution region 1'. Each distribution area 1, 1' is assigned to a corresponding first primary substation and second primary substation 3, 3' and defined by electrically unambiguously connected primary equipment (tree or feeder structure). Each primary substation 3, 3' can include a transformer that reduces the voltage from the HV level of the transmission or subtransmission grid down to MV levels suitable for regional transmission. Each primary substation 3, 3' can be connected to secondary substations 13, 13' via power lines and switches. In addition to being able to be connected to the secondary substations 13, 13', tap changing transformers 5, 5' can connect customers or LV feeders to the MV level. The system can include a plurality of primary devices, such as one or more of controlled transformers 5, 5', circuit breakers 7, 7', switches 9, 9' (open) and 11, 11' (closed), power sources for distributed generation 15' and controlled capacitors 17, 17'. A number of selected switches 11, 11' can designate the boundary between the adjacent first and second distribution regions (areas) 1, 1', and each distribution area can have additional boundaries to further neighbouring distribution areas.

In exemplary embodiments of the disclosure, distribution level network control can involve secondary equipment or process devices 21, 21' interacting with the aforementioned substations 3, 3', 13, 13', power lines, and other primary devices 15', 17'. In accordance with exemplary embodiments, each of the distribution regions 1, 1' can be assigned a distribution controller 19, 19' or Intelligent Substation Control System (ISCS) adapted to perform various control, optimization and management functions as detailed below.

Figure 2:
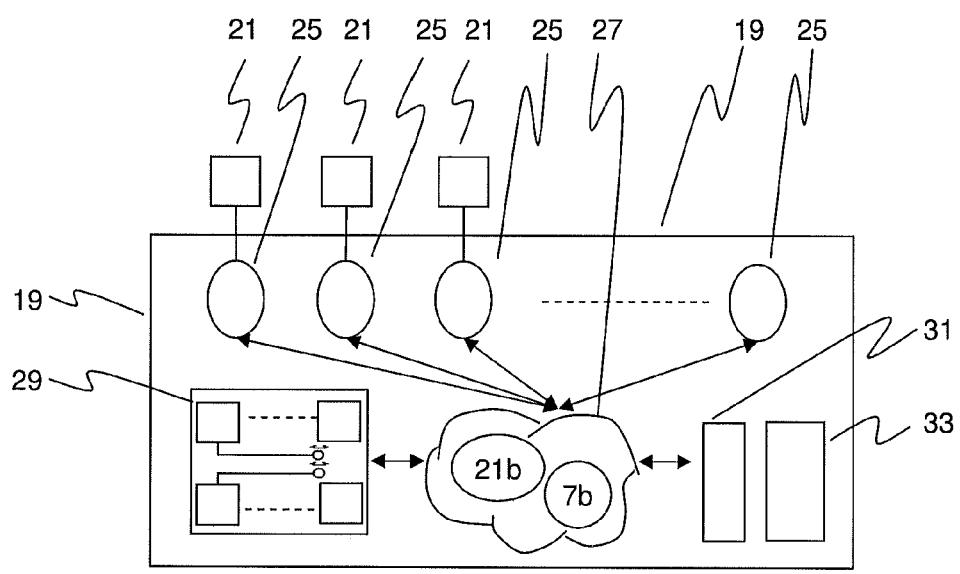
FIG. 2 shows exemplary components of a distribution controller according to an exemplary embodiment of the disclosure.

FIG. 2 schematically depicts elements of an exemplary distribution controller or Intelligent Substation Control System (ISCS) 19. The distribution controller or ISCS 19 can be assigned to a distribution region or area (e.g. one or more of distribution areas 1, 1' in FIG. 1). Master-protocol translators 25 (e.g. OPC servers) can provide for a translation of data received according to the various communication protocols used by the process devices 21 for data transfer, into a standard protocol or Common Data Model (CDM). CDM is an abstract model of the network and associated devices.

In exemplary embodiments of a non-IEC 61850 communication protocol and corresponding OPC server, a CDM object or software element may group individual OPC variables or data items according to the IEC 61850 standard. Accordingly, and irrespective of the communication protocol used, the CDM objects can represent the process devices 21 in an IEC 61850 compatible manner, can be hosted or accommodated by an OPC server instance of the controller, and can form an abstract data space 27. By way of example, the individual Logical Nodes (LN) in terms of IEC 61850—such as an exemplary Logical Node XCBR related to circuit breaker 7—can be represented by abstract CDM objects 21$b$, 7$b$. The CDM objects can then contain a mirror copy of specified data such as the attribute values of various LNs that the process devices 21 associated with the distribution controller 19 can provide.

According to a synchronizing "read/write" or "refresh" aspect of the CDM representation, whenever any control operation is ordered or a decision is made, the corresponding CDM object 21$b$ can be updated and the associated process device 21 can be automatically notified and ordered to carry out the operation. Likewise, whenever new data is available at the process devices (e.g. as a changed attribute value of Logical Node XCBR), the new data can be automatically sent to or streamed by the controller 19 in order to update the relevant CDM object 7$b$.

By using a communication infrastructure, the distribution controller 19 can, for example, collect and send data from/to the process devices 21 in its assigned control domain, data from/to the Network Control Center (NCC), and data from/to other distribution controllers located in other primary substations. The process devices 21 can gather the data from the primary devices and send the gathered data to the distribution controller 19. The distribution controller 19 can be configured, for example, to perform various control, optimization, and management functions. Examples of network control functions are voltage control, network restoration and network reconfiguration, while examples of network management functions are generation constraint management, line capacity constraint management, network loss reduction and asset management. Functions of the distribution controller 19 can be executed by processing means 29 (a computer or other processor) in conjunction with a coordinator 31 (e.g., a separate software and/or firmware module, or processor). The processing means 29 and the coordinator 31 can be communicably connected to the abstract data space 27 for accessing the relevant data. The abstract CDM model can make the control functionality independent of the communications models and protocols used in various networks. Rather than implementing control and optimization functions based on direct communication with the physical IEDs in the primary and secondary substations, the functions can operate on the abstract CDM in the distribution controller 19.

The distribution controller 19 can include an orphan section identification means 33 (e.g., a software and/or firmware module, or processor), which can identify the geographical extension of any orphan section generated, for example, as a consequence of a reconfiguration of network topology. The orphan section identification means 33 can, for example, identify and keep track of the switching devices forming the boundary of the orphan section. The orphan section identification means 33 can also, for example, identify and keep track of the links both to the previous "parent" distribution area (of which the orphan section had been part) and the neighbouring or adjacent areas of the latter (to one of which the orphan section is reassigned).

FIG. 3 depicts an exemplary power distribution system— such as the power distribution system of FIG. 1—following a network reconfiguration by way of closing the previously opened switches 11, 11' and opening the previously closed switch 9'. As a consequence, and in view of the above definition, a part or section 23 of the power distribution system, termed orphan section in the following, can be isolated or disconnected from the second distribution area 1', and joined or connected to the first distribution area 1. Known methods—such as connectivity tests on a graph representation of the power distribution network—can allow identification of both the detached orphan section 23 as well as the distribution region 1 to which the detached orphan section 23 is assigned.

Distribution controllers 19, 19' can be connected, for example via standard communication links, to the process devices 21, 21' interacting with the primary devices in the respective distribution area. The communication links of the network control are, for example, not affected by network reconfigurations, hence the control domains, as opposed to distribution areas, remain stable. In the example shown in FIG. 3, a communication link (dash dot line) is arranged between the first distribution controller 19 and the process devices 21' that interact with the secondary devices 13,' 17' which were previously part of the second distribution region 1'. This communication link can allow the first distribution controller 19 to control the now enlarged first distribution region 1 including the process devices 21' assigned to secondary devices 13', 17' of the orphan section 23.

As set out above, an intricate problem can occur when the network has been reconfigured and the electrical connectivity of the power grid no longer corresponds to the connectivity or domain of the communication system. In such a case, control and coordination algorithms executed by a particular distribution controller may need to access CDM objects that reside in other, for example neighbouring, distribution controllers. In other words, when the network has been reconfigured such that an orphan section of the network that was previously part of a first distribution area is now electrically connected to a second distribution area, the logical nodes (LNs) corresponding to the equipment in that section can be controlled by the distribution controller of the second distribution area. Consequentially, these LNs are no longer included in the network management application in their parent distribution controller.

As described in connection with FIG. 3, in an exemplary embodiment, each process device or physical IED can be associated with a master CDM object representing that IED and residing in a parent distribution controller to which the physical IED is connected via a communication link. The parent distribution controller can control, via the physical IED, primary devices in a parent distribution area as defined according to an initial or canonical network configuration. Following the reassignment of an orphan section, alias copies of the master CDM objects can be created on the second distribution controller controlling the distribution area to which the orphan section has been reassigned. The cross-controller access for making the alias copies can be based on a synchronization agent that is responsible for managing alias copies of master CDM objects on one or more distribution controllers and/or synchronizing the data in the alias and the source CDM objects, through synchronizing read/write or refresh operations similar to those that are available between the master CDM object and the real IED or LN it represents.

Each distribution controller can keep a standardized description or detailed model of the internal connectivity and the pieces of equipment of the assigned distribution area. This description can be arranged according to the Common Information Model (CIM) using the IEC 61850 substation section or private sections in a 61850 SCL file including links to the logical nodes which in turn contain references to the physical and logical devices. Upon creation of an orphan network section, a description of the orphan section can then transmitted to the second distribution controller now in charge of the orphan section. Though this can eliminate the need to keep a complete description of the entire network in each controller of the power distribution system, it can be advantageous to store on each of the distribution controllers a shared or limited network model comprising only the links or connections (mostly switches and lines) between the initially defined distribution areas. Such information can then facilitate the location of a master CDM object to a $2^{nd}$ generation alias created on any of the controllers.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

1, 1' power distribution region (also termed area or cell)
3, 3' primary substation
5, 5' controlled transformer
7, 7' circuit breaker
9, 9' switch (open)
11, 11' switch (closed)
13, 13' secondary substation
15' distributed generation
17, 17' controlled capacitor
19, 19' distribution controller or ISCS
21 process device
23 orphan section
25 master-protocol translator
27 abstract data space
29 processing means
31 coordinating means
33 identification means

What is claimed is:

1. A system for controlling a distribution of electrical power in a power distribution network, the system comprising:
   a distribution controller including a standardized description including a first model of an internal connectivity and pieces of equipment of a first power distribution region of a power distribution network, wherein the distribution controller is configured to be connected to first process devices of the first power distribution region, and to control a distribution of electrical power in the first power distribution region; and
   means to identify, following a network reconfiguration, an orphan network section that is disconnected from the first power distribution region and connected to a second power distribution region of the power distribution network,
   wherein the distribution controller is configured to transmit a standardized description including a second model of an internal connectivity and pieces of equipment of the identified orphan network section to another distribution controller connected to second process devices of the second power distribution region of the power distribution network.

2. The system according to claim 1, wherein the distribution controller is configured to accommodate a master representation of a process device of the orphan network section, and to transmit information to the another distribution controller for generating an alias of the master representation.

3. The system according to claim 2, comprising:
a first power distribution region of first primary devices configured to interact with the first process devices;
a second power distribution region of second primary devices configured to interact with the second process devices; and
the another distribution controller.

4. The system according to claim 2, wherein the process device of the orphan network section is an intelligent electronic device (IED).

5. The system according to claim 1, wherein the standardized description of the orphan network section includes information about all switching devices forming a boundary to neighboring distribution regions of the orphan network section.

6. The system according to claim 1, wherein the means to identify is included in the distribution controller, the system comprising:
a first power distribution region of first primary devices configured to interact with the first process devices;
a second power distribution region of second primary devices configured to interact with the second process devices; and
the another distribution controller.

7. The system according to claim 1, wherein the distribution controller is configured to only transmit, out of the standardized description of the first power distribution region, the standardized description of the identified orphan network section to the another distribution controller.

8. The system according to claim 1, wherein the distribution controller is configured to operate in an electrical power distribution system containing the first power distribution region, and the distribution controller does not have a description of the entire power distribution network.

9. The system according to claim 1, wherein the distribution controller is configured to:
accommodate a master representation of a process device of the orphan network section; and
transmit information to the second distribution controller for generating a first alias of the master representation.

10. The system according to claim 9, wherein the distribution controller is configured to synchronize the first alias and the master representation.

11. The system according to claim 10, wherein, upon a subsequent network reconfiguration, a third distribution controller is configured to generate a second alias of a process device interacting with doubly reassigned primary devices that had been assigned to the first distribution region, and
wherein the distribution controller is configured to synchronize the second alias with the master representation of the process device.

12. A method of controlling a distribution of electrical power in a power distribution network having a first power distribution region including first primary devices configured to interact with first process devices, a second power distribution region including second primary devices configured to interact with second process devices, a first distribution controller connected to the first process devices and provided with a standardized description including a first model of an internal connectivity and pieces of equipment of the first power distribution region, and a second distribution controller connected to the second process devices, the method comprising:
identifying, following a network reconfiguration, an orphan network section that is disconnected from the first power distribution region and connected to the second power distribution region; and
transmitting, by the first distribution controller, a standardized description including a second model of an internal connectivity and pieces of equipment of the orphan network section to the second distribution controller.

13. The method according to claim 12, comprising:
accommodating, by the first distribution controller, a master representation of a process device of the orphan network section; and
transmitting information to the second distribution controller for generating a first alias of the master representation.

14. The method according to claim 13, comprising:
synchronizing, by the first distribution controller, the first alias and the master representation.

15. The method according to claim 14, comprising:
generating, upon a subsequent network reconfiguration, by a third distribution controller, a second alias of a process device interacting with doubly reassigned primary devices that had been assigned to the first distribution region; and
synchronizing, by the first distribution controller, said second alias with the master representation of the process device.

16. The method according to claim 12, comprising:
arranging a communication link between the second distribution controller and first process devices that interact with first primary devices that are part of the orphan network section.

17. A non-transitory computer readable recording medium having instructions stored thereon for controlling one or more processors of a first distribution controller in a power distribution network, the power distribution network having a first power distribution region including first primary devices configured to interact with first process devices, a second power distribution region including second primary devices configured to interact with second process devices, the first distribution controller connected to the first process devices, and a second distribution controller connected to the second process devices, wherein, when the instructions are executed by the one or more processors of the first distribution controller, the instructions cause the first distribution controller to perform the following operations:
identifying, following a network reconfiguration, an orphan network section that is disconnected from the first power distribution region and connected to the second power distribution region; and
transmitting, by the first distribution controller, a standardized description including a model of an internal connectivity and pieces of equipment of the orphan network section to the second distribution controller.

18. The non-transitory computer-readable recording medium according to claim 17, wherein the instructions cause the first distribution controller to perform operations comprising:
accommodating a master representation of a process device of the orphan network section; and
transmitting information to the second distribution controller for generating a first alias of the master representation.

19. The non-transitory computer-readable recording medium according to claim 18, wherein the instructions cause the first distribution controller to perform operations comprising:
synchronizing, by the first distribution controller, the first alias and the master representation.

20. The non-transitory computer-readable recording medium according to claim 19, wherein upon a subsequent network reconfiguration, a third distribution controller generates a second alias of a process device interacting with doubly reassigned primary devices that had been assigned to the first distribution region; and the first distribution controller synchronizes the second alias with the master representation of the process device.

\* \* \* \* \*